No. 786,442. PATENTED APR. 4, 1905.
J. P. JACKSON.
ATTACHMENT FOR SPECTACLES.
APPLICATION FILED JAN. 18, 1904.
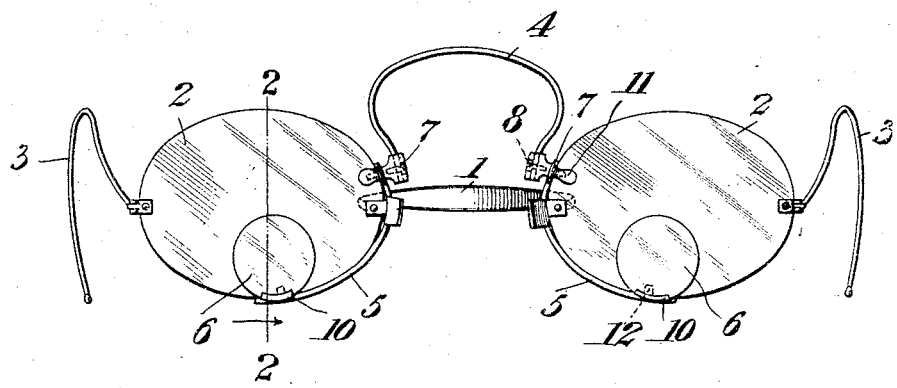
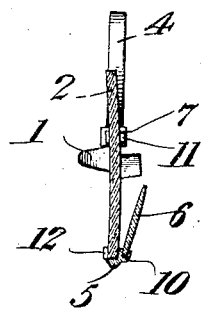
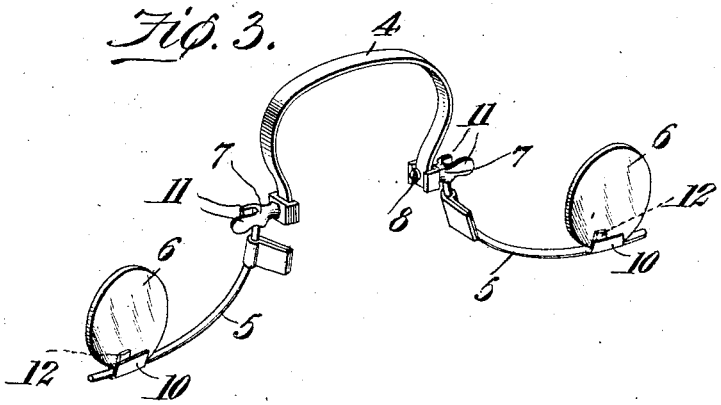
Witnesses
John P. Jackson, Inventor.

No. 786,442. Patented April 4, 1905.

UNITED STATES PATENT OFFICE.

JOHN PLUMMER JACKSON, OF ORLEANS, INDIANA.

ATTACHMENT FOR SPECTACLES.

SPECIFICATION forming part of Letters Patent No. 786,442, dated April 4, 1905.

Application filed January 18, 1904. Serial No. 189,604.

*To all whom it may concern:*

Be it known that I, JOHN PLUMMER JACKSON, a citizen of the United States, residing at Orleans, in the county of Orange and State of Indiana, have invented a new and useful Attachment for Spectacles, of which the following is a specification.

This invention relates to attachments to spectacles of that kind known generally to the trade as "grab fronts." Attachments of this character are used in combination with spectacles in cases where it is desirable to use temporarily lenses of a different power or variety from those with which the spectacles are provided—as, for example, if the spectacle-lenses are especially fitted to the peculiar condition of the eyes of the wearer and are designed for distant vision and it is impossible for the wearer to read a printed or written page or to examine nearby objects by means of the ordinary lenses the attachments known as "grab fronts" are adapted for application to the spectacles as supplemental glasses to enable the wearer to view objects near at hand by the aid of the ordinary lenses in combination with the lenses of the grab fronts.

The principal object of the present invention is to provide a spectacle attachment of the class mentioned in which supplemental lenses of smaller size are so placed relative to the lenses of the spectacles that they facilitate the view of objects near at hand, are disposed at such angles to the ordinary lenses that a minimum of aberration of the light-rays is produced by the passage of the rays through the supplemental lenses, and the possibility of injury to the lenses of the spectacles from the supplemental lenses is entirely obviated.

A further object of the invention is to provide in a spectacle attachment of the character specified a novel, simple, and easily-applied supporting structure by means of which the supplemental lenses may be held in proper relation to the spectacle-lenses.

With all of the objects mentioned and others in view, which will appear as the invention is more fully disclosed, the same consists in the novel construction, combination, and arrangement of parts of a spectacle attachment hereinafter fully described and claimed, and illustrated in a preferred form of embodiment in the accompanying drawings, it being understood that changes in the form, proportions, and exact mode of assemblage of the elements exhibited may be made without departing from the spirit of the invention or sacrificing the advantages thereof.

In the drawings, Figure 1 is a view in front elevation of a pair of spectacles with the attachment secured thereto in operative position. Fig. 2 is a sectional view through one of the spectacle-lenses and one of the lenses of the attachment upon the section-line 2 2 of Fig. 1. Fig. 3 is a view in perspective of the attachment removed from the spectacles.

In the drawings corresponding parts are designated by similar characters of reference throughout the several views.

Referring to the drawings by reference characters, 1 designates the bridge, and 2 2 the lenses, of an ordinary pair of spectacles, from which temples 3 3 extend at the sides in the usual manner. In the drawings the spectacles are of the modern rimless type, the temples and bridge being secured directly to the lenses; but the invention may be applied to spectacles in which the lenses are secured in bows or frames.

The attachment comprises a bridge 4, which is preferably an expansion-spring; oppositely-disposed lens-carrying arms 5, mounted at the bridge; lenses 6, mounted on the lens-supporting arms, and suitable lens-engaging hooks or projections associated with the arms 5. The arms 5 are preferably rigidly secured in members 7, to which the bridge 4 is fastened at its ends in any ordinary or preferred manner, as by means of screws 8 extending through openings in the ends of the bridge and securing said ends in sockets provided therefor in the members 7. The members 5 are preferably rods composed of some rather inelastic metal, as gold, and are bent to conform approximately to the outline of the spectacle-lenses 2 at the lower and inner portions of their margins. The supplemental lenses 6, mounted on the arms 5, are secured thereto in any suitable manner. In the form of the invention illustrated the lenses are secured in frames 10, which are rigidly attached to the arms 5 at suitable points; but the lenses may be adjustably secured upon the arms, if preferred. The lenses 6, carried by the arms 5, are relatively small as compared with the spectacle-lenses 2 and are preferably so placed upon the arms 5 that when the attachment is in position upon a pair of spectacles the lenses 6 will be in such position relative to the spectacle-lenses that when the wearer looks downward in the ordinary way in reading the lines of vision will pass directly through the centers of the lenses 6. As will be noted in the drawings, the lenses 6 are so mounted upon the arms 5 that when the attachment is in position upon the spectacles the spectacle-lenses and the lenses of the attachment are not parallel, but are disposed in planes making a decided angle at their line of intersection. This arrangement of the lenses 6 is adopted in order that the light coming from a book held in the ordinary position in reading may strike the surface of said lenses substantially at right angles thereto. This is desirable, because rays of light impinging obliquely upon lenses undergo much more aberration than those that strike the lenses perpendicularly, and a certain dimness of vision invariably results when the rays of light strike obliquely upon spectacle-lenses.

In order to hold the attachment securely upon spectacles, each of the members 7 is provided with a pair of projections 11, between which the lenses 2 of the spectacles lie when the attachment is in position, and each of the arms 5 has attached thereto just behind the lens 6, mounted on the arm, an upwardly-disposed projection 12, between which and the lens on the front of the arm the spectacle-lens is received.

In order to apply the attachment to the spectacles, the bridge 4 must be somewhat compressed to permit the members 7 to be introduced between the lenses and the curved lens-supporting arms 5 must be placed in position beneath the spectacle-lens, as shown in Fig. 1. The bridge will then be allowed to expand to bring the members 7 into the position shown in Fig. 1, in which the attachment will then be held by means of the projections 11 and 12 upon the members 7 and the arms 5, respectively. The attachment is so proportioned relative to the spectacles that when the supporting-arms 5 are in position just below the spectacle-lenses the members 7, to which said arms and the bridge 4 are secured, will lie just above the bridge 1 of the spectacles, and downward movement of the attachment will be prevented by the contact of the bridge with the members 7.

From the foregoing description it will be clearly seen that when the attachment is in position upon the spectacles it will be securely held in fixed relation thereto, and when it is desired to remove the attachment from the spectacles it may be instantly accomplished by merely compressing the bridge 4 sufficiently to permit the disengagement of the projections 11 of the members 7 with the margins of the spectacle-lenses. As the lens-supporting arms 5 are made of inelastic and moderately flexible metal, it is comparatively easy to curve said arms to correspond exactly to the form of the lens of any pair of spectacles, and by slightly twisting said arms the angle at which the lenses 6 should be held relative to the spectacle-lenses 2 may be accurately determined. In case the lenses 6 are adjustably mounted upon the arms 5, as mentioned in a preceding paragraph, the lenses may be shifted along said arms to correspond to the idiosyncrasies of all wearers of spectacles. As, however, the elasticity of the bridge 4 causes the attachment to adapt itself automatically to the length of the bridge 1, any change in the position of the lenses 6 upon the lens-supporting arms 5 will very seldom be required. Hence as a rule the lenses 6 will be rigidly secured upon the arms 5, so that any working loose of the lenses may be positively prevented.

As compared with grab-front attachments for spectacles as heretofore constructed the attachment above described, and illustrated in the accompanying drawings, is characterized by several important features of difference. The lenses employed in this attachment are much smaller than those heretofore employed, they are so supported relative to the spectacle-lenses as to produce a minimum amount of aberration, they interfere to a less extent with the use of the spectacles in viewing distant objects than the lenses of grab-front attachments as heretofore constructed, and they are held more securely in fixed relation to the spectacle-lenses than any other grab-front attachments with which I am familiar.

Having thus described the construction and use of my invention, what I claim as new, and desire to secure by Letters Patent, is—

1. An attachment for spectacles or the like, comprising a resilient bridge, supplemental lenses, frame members to which the lower edges of said supplemental lenses are secured, and spectacle-engaging members carried by the frame members at points adjacent to the lower edges of said supplemental lenses.

2. An attachment for spectacles or the like, comprising supplemental lenses of relatively small size, a frame to which the lower edges of said lenses are secured, and spectacle-engaging members carried by the frame, the connection between the frame and the lenses serving to maintain the same in a plane oblique to that of the spectacle-lens.

3. In an attachment for spectacles or the like, a bridge having an inherent spreading tendency, downwardly and outwardly curved arms carried by the bridge, and supplemental lenses having their lower edges only secured to said arms.

4. In a spectacle attachment, a resilient bridge, lens-carrying arms secured to said bridge, supplemental lenses of relatively small size mounted on said arms, and projections for engagement with the margins of the spectacle-lenses provided at the ends of said bridge and upon said arms in position for engagement with the lower portions of the margins of the spectacle-lenses.

In testimony that I claim the foregoing as my own I have hereto affixed my signature in the presence of two witnesses.

JOHN PLUMMER JACKSON.

Witnesses:
 CHARLES P. COLLINS,
 HOMER FISHER.